United States Patent [19]
Krosnick

[11] 4,203,344
[45] May 20, 1980

[54] MUSICAL EDUCATION TOY

[76] Inventor: Teresa A. Krosnick, 1645 B Waverly Way, Baltimore, Md. 21239

[21] Appl. No.: 19,238

[22] Filed: Mar. 9, 1979

[51] Int. Cl.$^2$ .............................................. G09B 15/04
[52] U.S. Cl. .................................. 84/470 R; 84/404; 84/477 R
[58] Field of Search ............ 84/402, 403, 404, 470 R, 84/471 R, 477 R, 478, 472, 476

[56] References Cited

U.S. PATENT DOCUMENTS

| 243,096 | 6/1881 | Bailey | 84/404 X |
| 1,137,394 | 4/1915 | Fowler | 84/404 |
| 2,788,608 | 4/1957 | Anthony | 84/404 X |
| 3,155,000 | 11/1964 | Gnatt | 84/478 |

*Primary Examiner*—Lawrence R. Franklin
*Attorney, Agent, or Firm*—John F. McClellan, Sr.

[57] ABSTRACT

A musical education game for teaching children to associate each letter name with a staff position and key position includes in exemplary form a keyboard operated array of hammers, each of which on the upstroke will lift or jiggle a corresponding note-related removable figurine or token and on the downstroke will sound a corresponding tone, if the token is positioned in proper location in a staff display by a student. A corresponding tone also sounds when the token is dropped into correct location, driving the corresponding hammer down. If the token is incorrectly located, it does not sound a note when dropped into place and when the hammer is actuated remains unmoved; in any case on the downstroke the hammer strikes a note corresponding to the respective key position but not identifiably aligned with it visually. Overlays for the keyboard include indicia grouping the notes in register, and additional structural provisions can aid the student in associating token position with staff position.

13 Claims, 6 Drawing Figures

MUSICAL EDUCATION TOY

This invention relates generally to music and particularly to musical education. A principal object of this invention is to provide apparatus to teach a child to associate a specific letter name with each given note position on a staff and its respective position on the keyboard simultaneously with or without formal instruction.

Further objects are to teach a child being instructed to recognize relative distance between one note and another, to teach the names and placements of notes by means of an actuatable instrument-related visual display with which children can interact, to reward and to correct children quickly in correspondence with success and failure in note and staff identification practice, and to combine illustration with challenge in an enjoyable way for the benefit of young music students.

Yet further objects are to provide an instrument which can be embodied, on an illustrative theoretical level, in apparatus for various kinds relating to various types of musical devices, which is easy to learn to use, is reliable in operation, is economical and durable, and is effective at encouraging children to learn for themselves.

In the prior art numerous instructional musical devices have been disclosed, including those in these U.S. Pat. Nos.

1,444,722 disclosing a xylophone device with keyboard;

1,291,202 disclosing a "metalophone" device with associated display;

2,265,237 disclosing a xylophone device with shaft staff display and actuation structures; and 2,788,697 disclosing key actuated moving objects associated with respective notes in a xylophone.

However, it is believed that none of the prior art makes fair suggestion of applicant's invention or provides the advantages set out in the objects herein.

In brief summary given for descriptive purposes only and not as limitation, the invention includes apparatus in which a student for instruction can place designators or tokens, representing notes, in a display, and can recognize correctness of placement of the tokens in the display through unique acceptance of each token in the corresponding location, accompanied by production of a corresponding tone, and further by operation of respective structures which sound notes corresponding to correct placement of the tokens and cause the tokens to move when and only when in correct placement;

The above and other objects and advantages of the invention will become more readily apparent on examination of the following description and drawings in which like reference numerals denote like parts:

Figure 1:
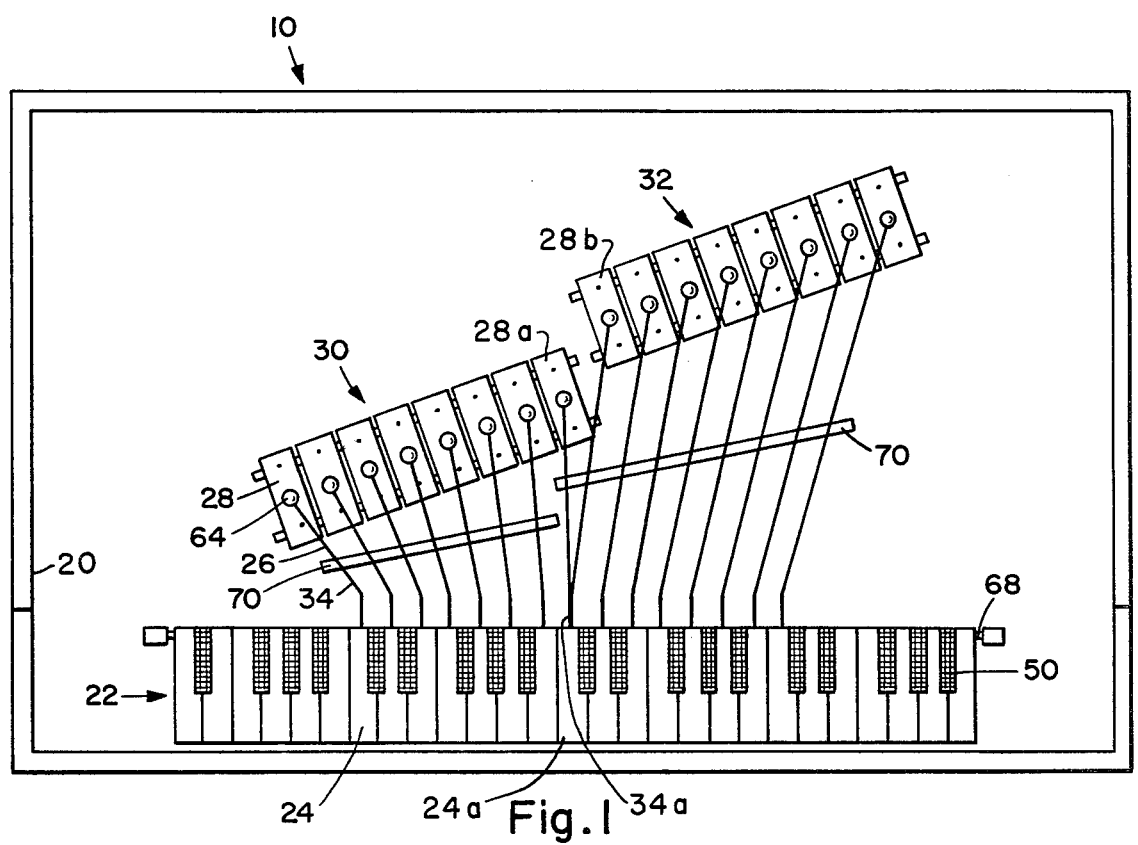
FIG. 1 is a plan diagram with a portion removed to show relation of interior and exterior elements.

FIG. 1 shows the invention 10 embodied in the form of a frame 20 holding piano-type keyboard 22, plural individual white keys 24 of which are associated through a system of key actuatable hammers 26 with a respective plurality of tone bars 28 in two arrays 30, 32 which are canted upwardly and offset to permit direct superposition of scale location on note struck, as will be seen. As will be seen also, another feature of the invention making it particularly suitable for teaching children to associate particular notes with staff positions without being able to correlate them directly by eye is the offset between each key and the note or in this case, the tone bar, sounded by it, represented by the inclined shanks 34 of the hammers, noticeably out of parallel with the elongate keys. As will be seen later, 50 denotes black key, 64 hammer head, 68 key pivot axis, and 70 rest.

A feature of this invention is that two bar tones 28a sound middle c, in correspondence with the two customary staffposition middle c's. One key 24a sounds both simultaneously by means of two hammer shanks which are affixed to the key and diverge to respective hammer heads at the two bar tones.

Figure 2:
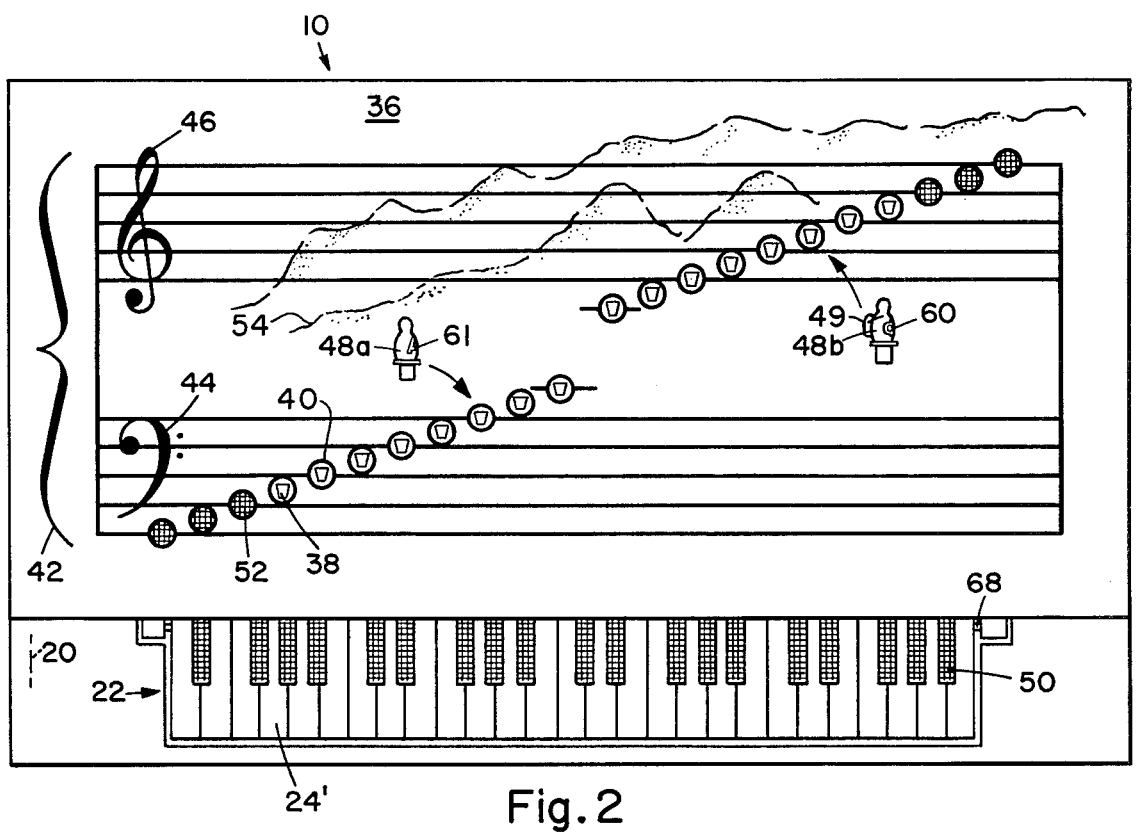
FIG. 2 is a plan diagram of one form of structure for overlay on the top surface of the display part of the invention.

FIG. 2 illustrates the provision of staff-indicating overlay 36 with a hole 38 defining each note position 40 in a grand staff 42 with bass staff 44 and treble staff 46. As will be seen, these holes are uniquely coded and are spaced and located to overlie exactly respective balls or hammerheads, and tone bars, so that respective designators or tokens 48a and 48b may be fitted into the holes by students as practice exercises and as verifiers of correctness when the respective keys are struck. On correct placement of token the unique coding that matches any hole and its corresponding token permits the token to drop, the drop produces contact between the token and the ball underneath. This impact sends the ball downward causing it to hit the bar which produces the corresponding tone. Therefore, two things let the child know that the token is in correct position. First it fits and because it fits a tone is heard. If correctly placed, the tokens jiggle when the correct key is struck causing the hammerhead to strike the token. For simplicity, although all keys may be operable, some need not.

The black keys 50 may be fixed to the frame and note positions for these omitted as here noted. If the black keys were to be mechanically and instructionally functional, additional bar tones and staff positions corresponding to the black keys could be placed between those already present for the white keys. In such case either: (1) one overlay with staff positions corresponding to both black and white keys or a set of progressive overlays, e.g. one overlay like the one in this Figure, (except that spacing of staff positions would be irregular) which corresponds to the white keys only, (2) one overlay which includes staff positions for both black and white notes, with sharp spellings and (3) one overlay with staff positions for both black and white notes, with flat spellings, would be appropriate. An inoperative black key position is shown at 50 and an inoperative white key position at 24'. Corresponding note positions may be solid black, 52, without holes.

Differentiation is established between the bass and treble clef tokens with large and small case letters respectively. Any markings indicative of ascending and descending motion would be appropriate.

For example, co-acting with the ascending tone bar and note hole locations may be markings 54 indicative of sloping terrain to enhance the staff relations, the tokens may be human-figurine hikers 48a at the bass staff showing against a less rugged environment to indicate the lower range, and those 48b at the higher or treble staff climbing with back packs 49 in mountainous terrain to indicate a higher range.

Corresponding with the key middle c and the two staff positions middle c, there will be two tokens, both with lower case letters, one without back pack and one with back pack.

As noted, hole coding is an important part of the invention, governing a function of the apparatus and thus of the teaching effectiveness.

Figure 3A:
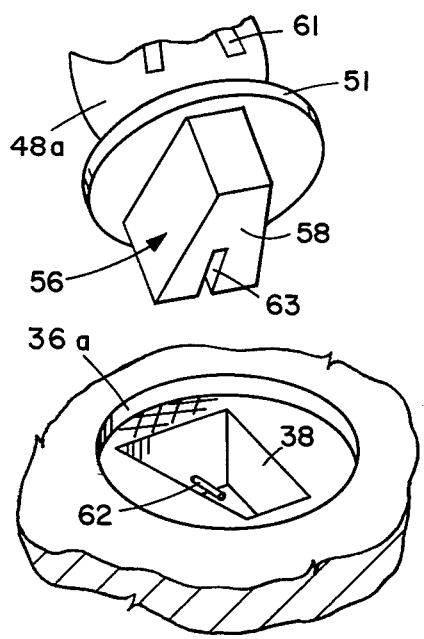
FIG. 3a is a perspective diagram of a form of hole-coding.

FIG. 3a diagrams a form of hole coding answering the requirements of this invention.

In the operation according to the invention, each token 48a, 48b must be placed in the correct staff-position hole 38 by the student before the corresponding key-driven hammer can reach it on rising and cause it to lift or jiggle slightly in the hole, further verifying: (a) correct positioning and correspondence of the note-letter marking 60, 61 on the token with the note sounded by the key, (b) visual correspondence wih a staff position, and (c) correspondence of key position on the keyboard.

A correctly positioned token matches the hole coding unique to it and inserts fully into the hole with the bottom 56 of the token dropping to a position just beneath where the top of the hammerhead rests. This thrusts the hammerhead downward, causing it to hit the bar tone and sound a tone. On actuation by the corresponding key the hammerhead moves the token, further verifying positioning, but more specifically verifying that a student has correctly chosen the corresponding key.

An incorrectly positioned token fails to match the hole coding and inserts into the hole partway only, with the bottom of the token too high to be struck and moved or jiggled by the hammer head, so that it remains immobile at all times, signifying wrong location. Hopefully the child who has become acquainted with this toy will realize prior to trying a key that he has not heard a sound nor experienced the sensation of correct placement and that therefore it would be impossible to pop the token up by depressing a key. It will be appreciated that the main emphasis of instruction is not merely on staff identification, but instead that staff identification is a prerequisite to the total association of token identity and staff position to corresponding positions on an instrumental apparatus, in this case the keyboard.

Coding may comprise, as shown, orientation coding as through matching trapezoidal hole shapes and token bottom perimeter shapes, 38, 58, assuring front display of the note-identifying letter 60, 61, on every token inserted, right or wrong coding notwithstanding.

Second, depth coding may comprise a matching peripheral location pin 62 in the side of the hole and notch 63 in the side of the token bottom. If these fail to match in location the bottom of the token rests on the pin in position too high for striking by the hammer. If they match, the notch receives the pin and the token inserts fully until stopped as by the pin bottoming in the slot, in position for being struck by the hammer.

Skirts 51 preferably fitting into annular recesses 36a around the respective holes conceal them to prevent biasing the student by seeing in advance whether the parts will fit, and for the same reason the hole surround are preferably made black, rough, or otherwise nonreflective.

Figure 3B:
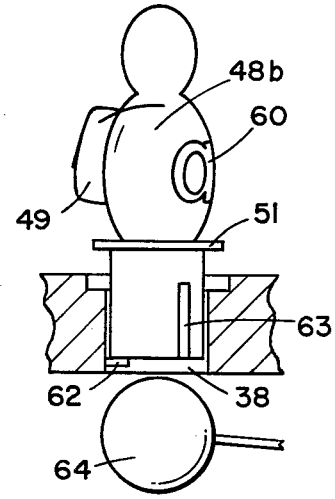
FIG. 3b is a side elevational fragmentary diagram of result of hole and token relation not in accordance with hole coding.

FIG. 3b shows the relation of the parts when the coding of the token 48b and hole 38 fail to match; the hammer head 64 cannot reach the token and the token cannot reach the hammerhead.

Figure 3C:
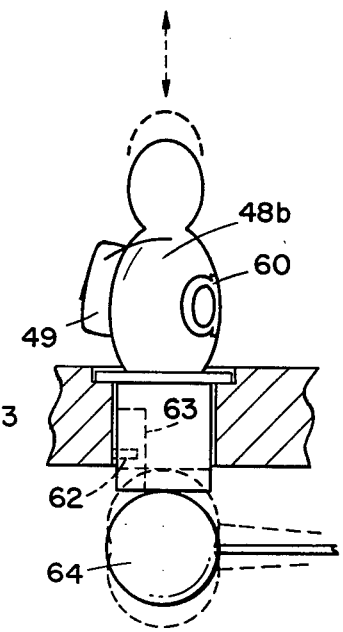
FIG. 3c is a side elevational fragmentary diagram of result of correct hole and token relation in accordance with coding.

FIG. 3c shows correct relation of token 48b and hole 38; the token can drive the hammerhead down, and where the appropriate key is struck, the hammerhead 64 strikes and moves (broken lines) the token 48b upward; as they both fall the hammer sounds the note corresponding to the note marked on the jiggled token.

Figure 4:
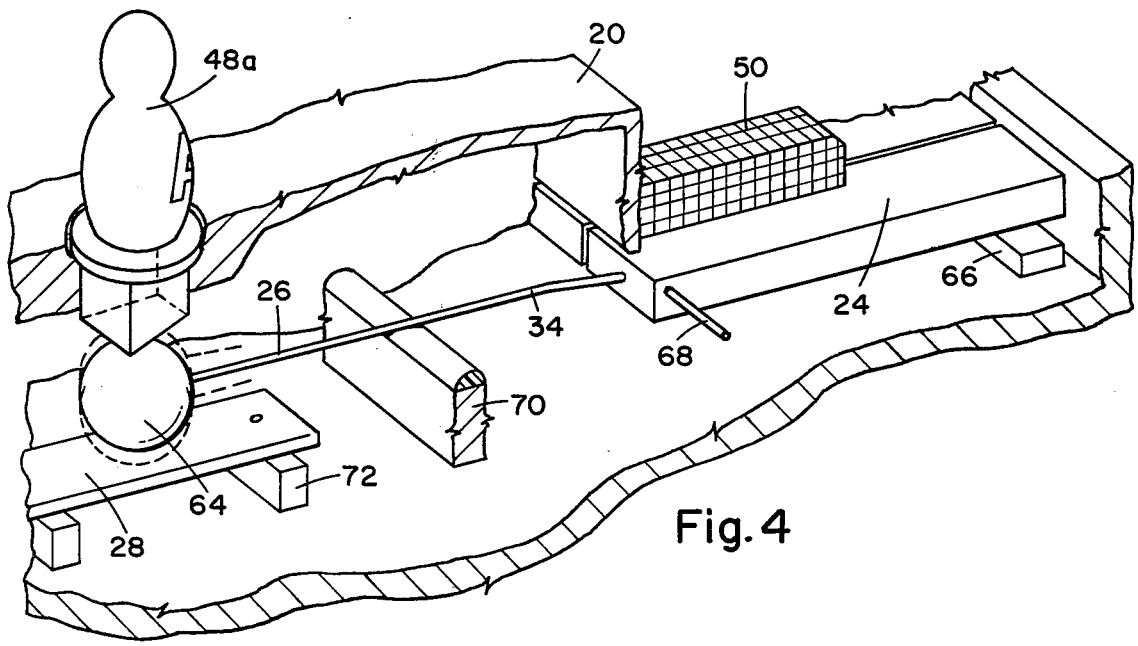
FIG. 4 is a perspective fragmentary diagram of structural details.

FIG. 4 shows a preferred mode of construction of the unit. Key 24 can be depressed only to the limit set by contact with strip 66 fixed beneath it, assuring that taking account of the flexibility of the assembly, the travel of the hammer head will reach only the desired operating height at which only a correctly coded or dropped-bottom token 48a will be struck. Individual bars of different heights may be used for this, if desired, to adjust for differing hammer shank lengths.

Each key supports a corresponding hammer 26, the shank of which may be force fitted, screwed, or cemented in the fulcrum end of the key.

Rod 68 which may pass transversely through the fulcrum end of the keys as a pivot or fulcrum for them, may also for support pass through the black keys 50 which may rigidly affix to the frame 20 as by cement or other conventional means.

Hammer heads 64 may be conventional felt-covered wood or metal spheres, heavy enough to overbalance the corresponding keys. Each hammer shank 34 may be of piano wire of conventional diameter proportional to length such as 1 mm diameter for 10 cm length, to strike and flexually pivot about felt covered stop 70 and momentarily contact a tone bar 28 in conventional manner (broken lines) when dropping, under the overbalancing weight of the hammerheads, upon key release and when forced down by a token. Adjustment may be by bending the wires. The xylophone-type tone bars and mounts 72 may be conventional although not restricted to any particular configuration and the frame 20 and overlay 36 may be of wood or plastic. It is to be understood that many different musical instruments may be the basis of the invention without departing from the principle. Further, orientation of the tokens may be toward the student, may be with sides to students toiling uphill, or may be as if descending if desired, according to how hole orientation is made during construction, or according to construction of the tokens.

The tokens should be of lightweight material, for example, of hollow polyethylene or of balsa wood, with weighted bottoms, which may be hardwood, screwed or cemented in place.

In conclusion, detailing the operation of the structure shown in this Figure more fully, first the child being taught places the tokens in the holes in the order believed to be correct by the child. The child, alternatively, may try the holes with one token. Then it decides which key or keys to strike, the decision being made, as noted, independent of direct visual correlation. When a key, 24 shown, is struck, it pivots about rod 68. Pivoting of the key pivots hammer shank 34 upwardly causing the hammer head 64 to strike the bottom of a correctly positioned token, lifting the correctly positioned token to signify which note will be sounded when the key is released. On release of the key, the hammer falls, flexing the shank 34 about stop 70 so that the hammer head 64 limits the travel of the key and thus of the hammer head.

Although the invention has been illustrated herein in a mechanical embodiment, it will be appreciated that electronic, fluid or other embodiment can be encompassed within the spirit of the invention and that the use of a piano type keyboard is merely illustrative of one embodiment of the principle of the invention.

What is claimed and desired to be protected by United States Letters Patent is:

1. In a toy for musical education comprising means defining respectively corresponding pluralities of: notes in scale positions, keys in a keyboard, hammers, and tone bars associated with said hammers, the improvement comprising: a plurality of tokens having respective identifying means, each token having correspondence to a respective one of said notes, first means for sounding each tone bar by dropping a respective token at a scale position thereabove; and means for associating said tone bar, token identity and scale position with position of a said key independent of visible key alignment with said scale position.

2. In a toy as recited in claim 1, said first means and said identifying means including structure defining an opening at each scale position for uniquely receiving a particular token to a position therein and excluding all other said tokens from said position, means movably mounting a said hammer below each opening and in said position for thereby being driven down by a token when received in said opening, and means fixing a said tone bar in location below said hammer for being struck by said driving down of the hammer and emitting a tone corresponding to said scale position.

3. In a toy as recited in claim 2, the means for associating including means for operating each hammer to rise and fall in response to a respective said key and plural of said hammers having different respective visual alignments relative to the corresponding keys.

4. In a toy as recited in claim 3, the means for associating including the rise of each hammer proportioned for moving a token uniquely received in a said opening.

5. In a toy as recited in claim 4, said means defining a plurality of notes in scale position including bass staff and treble staff, and the means for associating including means denoting respective groups of said tokens as associatable with the bass staff and with the treble staff.

6. In a toy as recited in claim 5, the plurality of tokens being in human form, and said means denoting including indication of mountain climbing for said group associatable with the treble staff.

7. In a toy as recited in claim 6, said means defining a plurality of notes in scale position comprising separable overlay structure.

8. In a toy as recited in claim 4, said defining structure including means for orienting all tokens in a particular direction.

9. In a toy as recited in claim 8, each token having a skirt thereon proportioned for concealing a said opening.

10. In a toy as recited in claim 9, the area around each opening having means for suppressing reflection therefrom.

11. In a toy as recited in claim 10, the movable mounting means including pivotal mounting; and a rest proximate said hammer.

12. In a toy as recited in claim 1, wherein said means for associating includes one of said keys in the keyboard having means for sounding two tone bars simultaneously, said two tone bars having the same pitch.

13. In a toy as recited in claim 12, wherein the respective tokens associated with said two tone bars have different structure.

* * * * *